(12) United States Patent
Nagaoka et al.

(10) Patent No.: US 9,429,240 B2
(45) Date of Patent: Aug. 30, 2016

(54) VALVE DEVICE

(71) Applicant: Komatsu Ltd., Tokyo (JP)

(72) Inventors: Keita Nagaoka, Oyama (JP); Yuusuke Miyamoto, Oyama (JP); Toyomi Kataoka, Oyama (JP)

(73) Assignee: Komatsu Ltd., Tokyo (JP)

( * ) Notice: Subject to any disclaimer, the term of this patent is extended or adjusted under 35 U.S.C. 154(b) by 405 days.

(21) Appl. No.: 14/235,605

(22) PCT Filed: Jul. 5, 2013

(86) PCT No.: PCT/JP2013/068548
§ 371 (c)(1),
(2) Date: Jan. 28, 2014

(87) PCT Pub. No.: WO2015/001675
PCT Pub. Date: Jan. 8, 2015

(65) Prior Publication Data
US 2016/0186868 A1 Jun. 30, 2016

(51) Int. Cl.
*F16K 3/34* (2006.01)
*F16K 3/26* (2006.01)

(52) U.S. Cl.
CPC ...................... *F16K 3/26* (2013.01)

(58) Field of Classification Search
USPC .................................... 137/625.35
See application file for complete search history.

(56) References Cited

U.S. PATENT DOCUMENTS

| | | | |
|---|---|---|---|
| 3,556,155 A | * | 1/1971 | McWilliams .......... B62D 5/087 137/625.3 |
| 4,640,094 A | * | 2/1987 | Wittren .................. B62D 5/32 180/441 |
| 4,862,920 A | * | 9/1989 | Cleasby .................. F15B 13/04 137/625.3 |
| 5,271,430 A | | 12/1993 | Muruyama et al. |
| 5,682,744 A | | 11/1997 | Hasegawa et al. |

(Continued)

FOREIGN PATENT DOCUMENTS

| | | |
|---|---|---|
| CN | 1796802 A | 7/2006 |
| CN | 101334052 A | 12/2008 |
| JP | 57-107471 A | 7/1982 |

(Continued)

OTHER PUBLICATIONS

Office Action dated Apr. 7, 2015, issued for the corresponding German patent application No. 112013000159.4 and English translation thereof.

(Continued)

*Primary Examiner* — John Fox
(74) *Attorney, Agent, or Firm* — Locke Lord LLP

(57) ABSTRACT

A valve device switching between an open position and a close position, the open position allowing passage of oil through a gap between two ports in a spool bore from a small-diameter portion of a spool via a notch formed in a large-diameter portion of the spool, the close position blocking passage of oil through the gap between the two ports by the large-diameter portion, wherein the notch of the large-diameter portion has an inner bottom face at a portion located on a center side of the spool and is open to an outer peripheral space of the small-diameter portion and an outer peripheral surface of the large-diameter portion, and is formed such that an opening width of an opening at the outer peripheral surface is larger than a width of the inner bottom face.

1 Claim, 8 Drawing Sheets

(56) References Cited

U.S. PATENT DOCUMENTS

| | | |
|---|---|---|
| 6,397,890 B1 | 6/2002 | Mickelson et al. |
| 2006/0130915 A1 | 6/2006 | Lee |

FOREIGN PATENT DOCUMENTS

| | | |
|---|---|---|
| JP | 57-163057 U | 10/1982 |
| JP | 60-131769 U | 9/1985 |
| JP | 62-153466 U | 9/1987 |
| JP | 63-668 B | 1/1988 |
| JP | 2-29359 U | 2/1990 |
| JP | 02-029359 U | 2/1990 |
| JP | 04-031372 U | 3/1992 |
| JP | 08-011736 A | 1/1996 |
| JP | 08-061521 A | 3/1996 |
| JP | 2533550 Y2 | 4/1997 |
| JP | 10-252903 A | 9/1998 |
| JP | 11-280705 A | 10/1999 |
| JP | 2001-241559 A | 9/2001 |
| JP | 2001-282362 A | 10/2001 |
| JP | 2005-140248 A | 6/2005 |

OTHER PUBLICATIONS

International Search Report dated Aug. 27, 2013, issued for PCT/JP2013/068548.

* cited by examiner

VALVE DEVICE

FIELD

The present invention relates to a valve device, and specifically relates to an improvement in a valve device switching between an open position and a close position by moving a spool with respect to a valve body. The open position allows passage of oil through a gap between two ports in the valve body via a notch formed in a large-diameter portion of the spool from a small-diameter portion thereof. The close position blocks passage of oil through the gap between the two ports by the large-diameter portion.

BACKGROUND

A valve device is configured to switch between an open position and a close position by moving a spool with respect to a spool bore formed in the valve body. The open position allows passage of oil through a gap between two ports in the spool bore via a notch formed in a large-diameter portion of the spool from a small-diameter portion thereof. The close position blocks passage of oil between the two ports by the large-diameter portion. In this type of valve device, when oil passes through a gap between two ports formed in a spool bore with a spool arranged at an open position, a force (flow force) acts so as to make the spool return to a close position. As a result, a problem may be caused that an oil flow rate does not increase as intended.

Therefore, in the related art, there has been provided a valve device configured to change the direction of oil flowing in a port in a spool bore via a notch of a spool. The valve device can reduce a flow force acting to return the spool to a close position since the flowing direction of oil is changed with respect to a center axis of the spool (for example, refer to Patent Literature 1).

CITATION LIST

Patent Literature

Patent Literature 1: Japanese Unexamined Patent Application Publication No. 8-61521

SUMMARY

Technical Problem

However, in the valve device described above, the notch of the spool always needs to open in a preset direction to the port so that a mechanism for preventing rotation of the spool with respect to the valve body is necessary. Specifically, after the spool is provided in the valve body, rotation of the spool with respect to the valve body is prevented with a component interposed between the valve body and the spool. Such valve device causes an increase in manufacturing cost with an increasing number of components. In addition, when the spool is provided in the valve body, a rotational position of the spool with respect to the spool bore needs to be determined, which causes a complicated manufacturing operation.

In view of the circumstances, an object of the present invention is to provide a valve device allowing passage of a predetermined quantity of oil without causing an increase in manufacturing cost or a complicated manufacturing operation.

Solution to Problem

To achieve the object mentioned above, according to the present invention, a valve device including a spool having a small-diameter portion and a large-diameter portion in parallel to an axial direction, the spool being arranged in a spool bore formed in a valve body, the valve device being configured to switch between an open position and a close position by moving the spool in the axial direction with respect to the valve body, the open position allowing passage of oil through a gap between two ports in the spool bore via a notch formed in the large-diameter portion from an outer peripheral space of the small-diameter portion, the close position blocking passage of oil through the gap between the two ports by the large-diameter portion, wherein the notch of the large-diameter portion has an inner bottom face at a portion located on a center side of the spool and is open to the outer peripheral space of the small-diameter portion and an outer peripheral surface of the large-diameter portion, and is formed such that an opening width of an opening at the outer peripheral surface is larger than a dimension of the inner bottom face.

In the present invention, the notch of the large-diameter portion includes: a main notch portion being open to the outer peripheral space of the small-diameter portion via a rectangular opening formed along a radial direction of the spool; and a widening notch portion having a larger dimension than the main notch portion and being open to the outer peripheral surface of the large-diameter portion.

In the present invention, the notch of the large-diameter portion is arranged at a plurality of portions.

In the present invention, the valve device, further comprises a detour passage passing through an inside of the spool from the inner bottom face of the notch and being open to the outer peripheral surface of the large-diameter portion, and configured to discharge oil present at the notch from the outer peripheral surface of the large-diameter portion when the spool is arranged at the open position.

In the present invention, the large-diameter portion has four notches formed at equal intervals around a center axis of the spool, each of the notches including: a main notch portion being open to the outer peripheral space of the small-diameter portion via a rectangular opening formed along a radial direction of the spool, and having the inner bottom face parallel to the center axis of the spool and orthogonal to the radial direction of the spool; and a widening notch portion having a larger dimension than the main notch portion and being open to the outer peripheral surface of the large-diameter portion, and the valve device further comprises a detour passage passing through an inside of the spool from the inner bottom face of the notch and being open to the outer peripheral surface of the large-diameter portion, and configured to discharge oil present at the notch from the outer peripheral surface of the large-diameter portion when the spool is arranged at the open position.

Advantageous Effects of Invention

According to the present invention, a notch of a large-diameter portion is formed such that the opening width of an opening at an outer peripheral surface is larger than the dimension of an inner bottom face. Thus, an opening area through which oil passes increases when the spool is arranged at an open position, so that a flow velocity becomes lower and then a flow force is reduced. Besides, at a processing step, a notch needs at least to be formed such that the dimension of an opening at an outer peripheral surface

BRIEF DESCRIPTION OF DRAWINGS

FIG. 1-2 is a sectional side view of main parts of the valve device, illustrated in FIG. 1-1, at the close position.

FIG. 2-1 is a sectional plan view of main parts of the valve device, illustrated in FIG. 1-1, at an open position.

FIG. 2-2 is a sectional side view of main parts of the valve device, illustrated in FIG. 1-1, at the open position.

FIG. 9-1 is a cross-sectional view of main parts schematically illustrating how oil flows when the valve device illustrated in FIG. 1-1 is at the open position.

FIG. 9-2 is a sectional side view of main parts schematically illustrating how oil flows when the valve device illustrated in FIG. 1-1 is at the open position.

FIG. 10-1 is a plan view of the spool applied to a valve device according to a second embodiment of the present invention.

FIG. 10-2 is a sectional view taken along line D-D of FIG. 10-1.

DESCRIPTION OF EMBODIMENTS

Hereinafter, preferred embodiments of a valve device according to the present invention will be described in detail with reference to the accompanying drawings.

Figure 1:
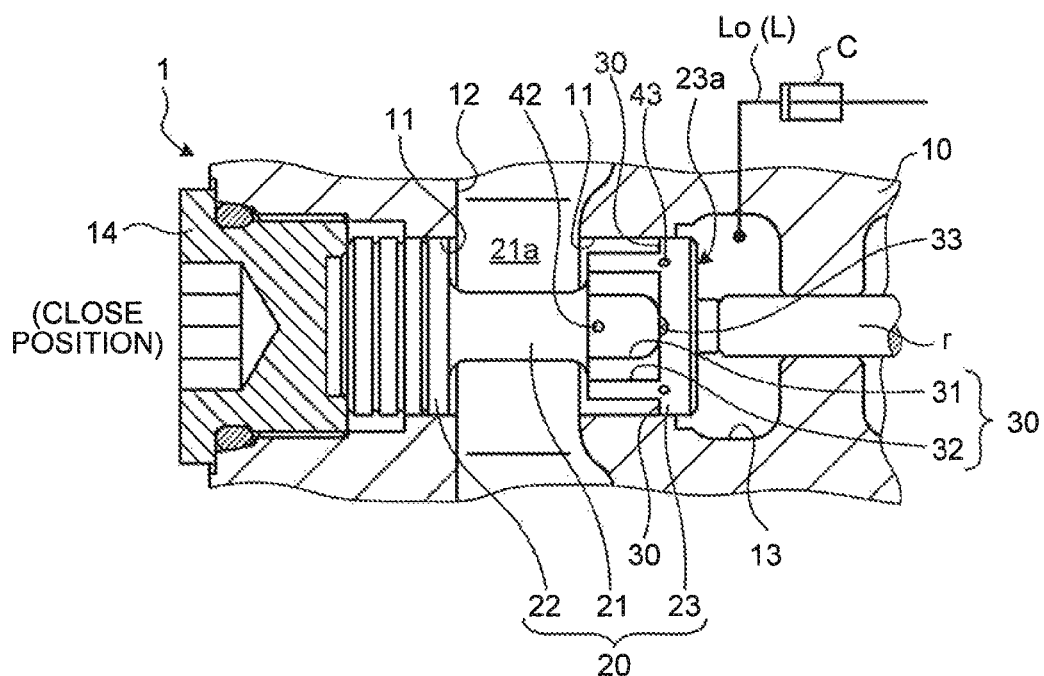
FIG. 1-1 is a sectional plan view of main parts of a valve device at a close position according to a first embodiment of the present invention.
Figures 1, 2:
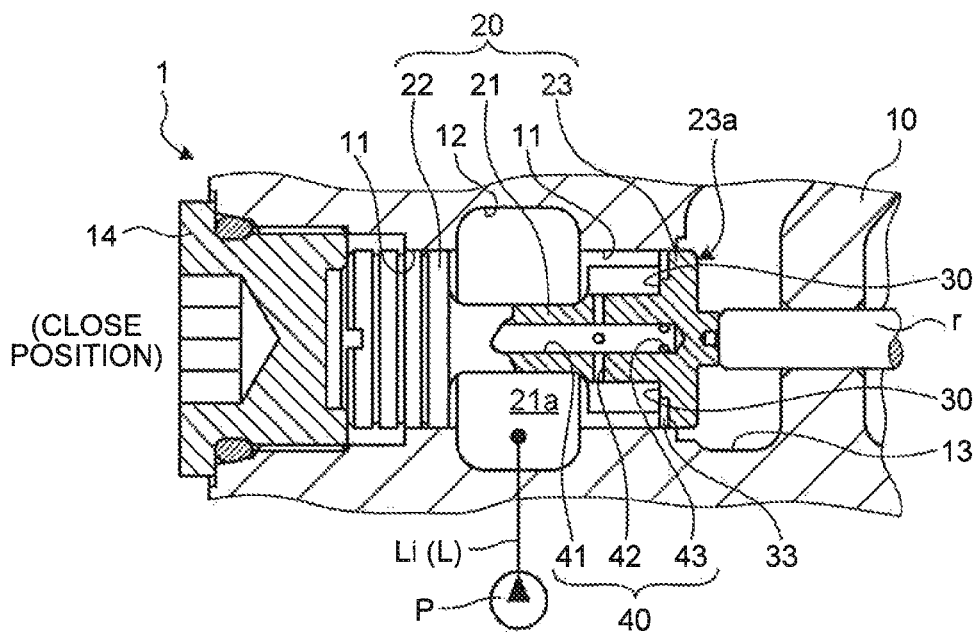
Figures 1, 2:
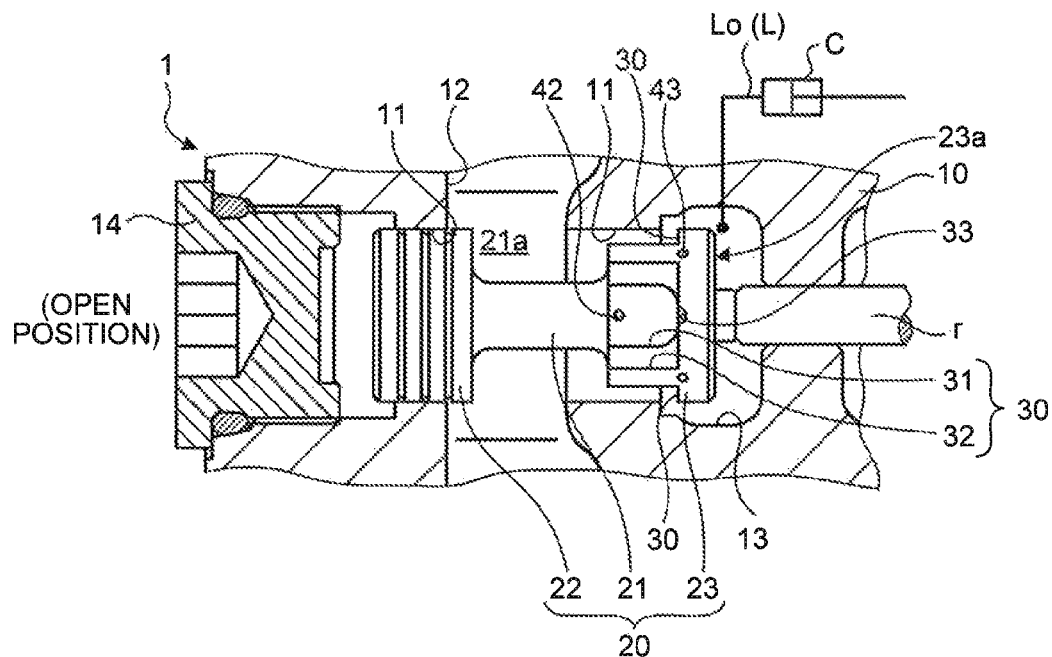
Figure 2:
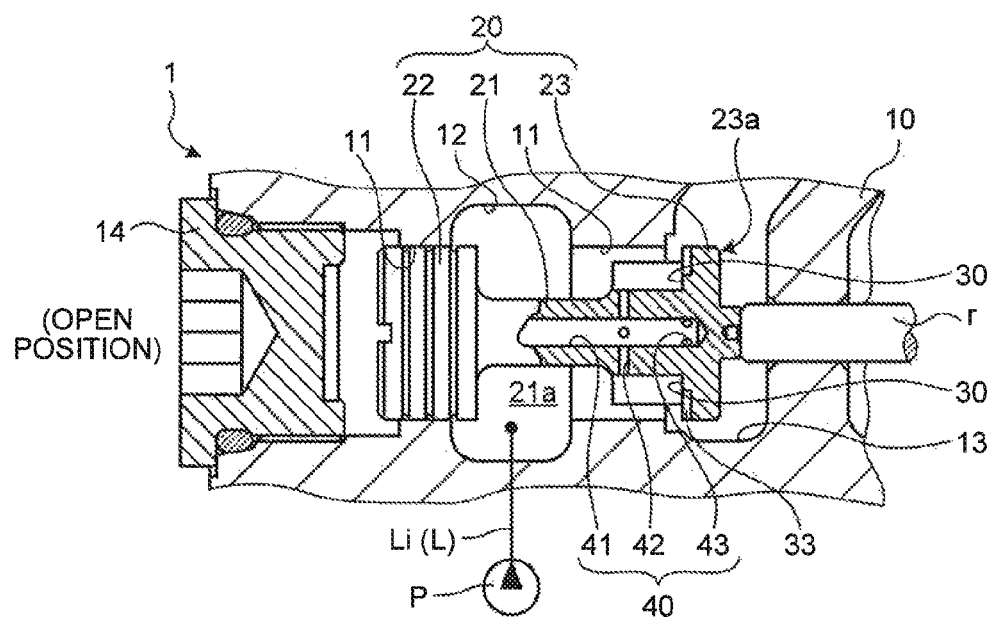
Figure 3:
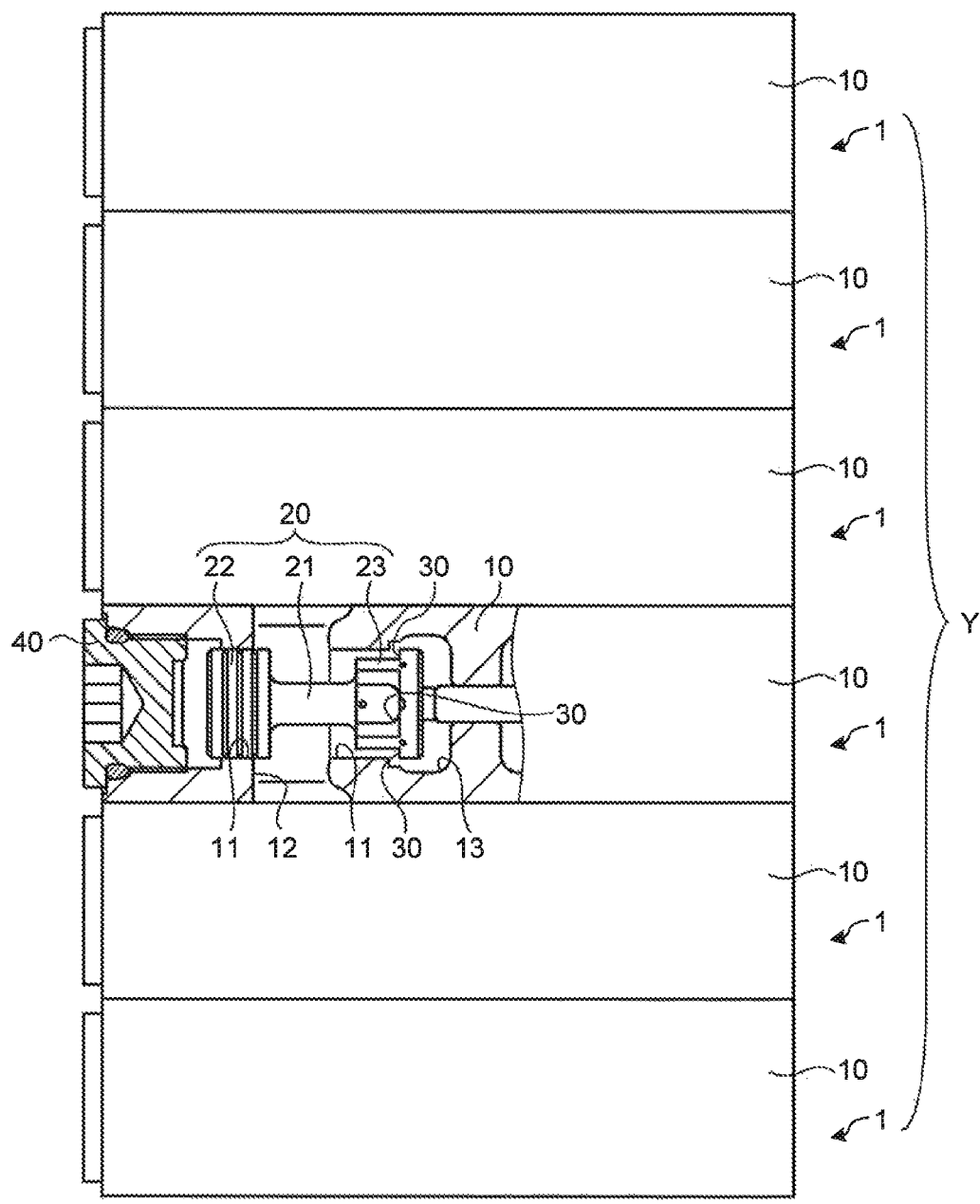
FIG. 3 is a partially cutaway plan view of a valve unit including a plurality of valve devices, illustrated in FIG. 1-1, in parallel.

FIGS. 1-1 to 2-2 are views illustrating a valve device according to a first embodiment of the present invention. The valve device 1 exemplarily illustrated herein is provided at an oil passage L between a hydraulic pump P and a hydraulic cylinder (hydraulic actuator) C and for controlling an oil flow rate to the hydraulic cylinder C. Specifically, the first embodiment shows an example of, as illustrated in FIG. 3, valve devices 1 with similar configurations included in a valve unit Y in parallel. Although not explicitly illustrated in the figure, the valve unit Y can individually control an oil flow rate to a plurality of hydraulic cylinders by driving each valve device 1. The valve unit Y is applicable to, for example, a construction machine for doing intended tasks through cooperation among the hydraulic cylinders.

Configuration of Valve Device 1

The valve device 1 according to the first embodiment includes a valve body 10 in a rectangular parallelepiped shape, and a spool 20 in a spool bore 11 formed in the valve body 10.

The spool bore 11 in the valve body 10 is a circular opening in cross-section. The spool bore 11 includes, as illustrated in FIGS. 1-1 to 2-2, ports 12 and 13. The port 12 is provided at a position corresponding to an intermediate portion of the spool bore 11 in an axial direction. The port 13 is provided at a position corresponding to a right end of the spool bore 11 in FIGS. 1-1 and 1-2. These two ports 12 and 13 are located in the axis identical to that of the spool bore 11 and are spaces formed such that the outer diameters of the ports are larger than that of the spool bore 11. The port 12 provided at a position corresponding to the intermediate portion of the spool bore 11 is connected to a supply side oil passage Li connecting the port 12 and a discharge port of a hydraulic pump P. Although not explicitly illustrated in the figure, the port 12 of the valve body 10 is provided so as to communicate with ports 12 in neighboring valve devices 1. The port 13 provided at an end of the spool bore 11 is connected to a discharge side oil passage Lo connecting the port 13 and a pressure chamber of a hydraulic cylinder C.

Incidentally, a port provided at the intermediate portion of the spool bore 11 is hereinafter referred to as a "pump port 12" and a port provided at the end of the spool bore 11 an "actuator port 13" to distinguish between the two, for convenience. In addition, reference numeral 14 in the figure denotes a plug for closing an opening end of the spool bore 11.

Figure 4:
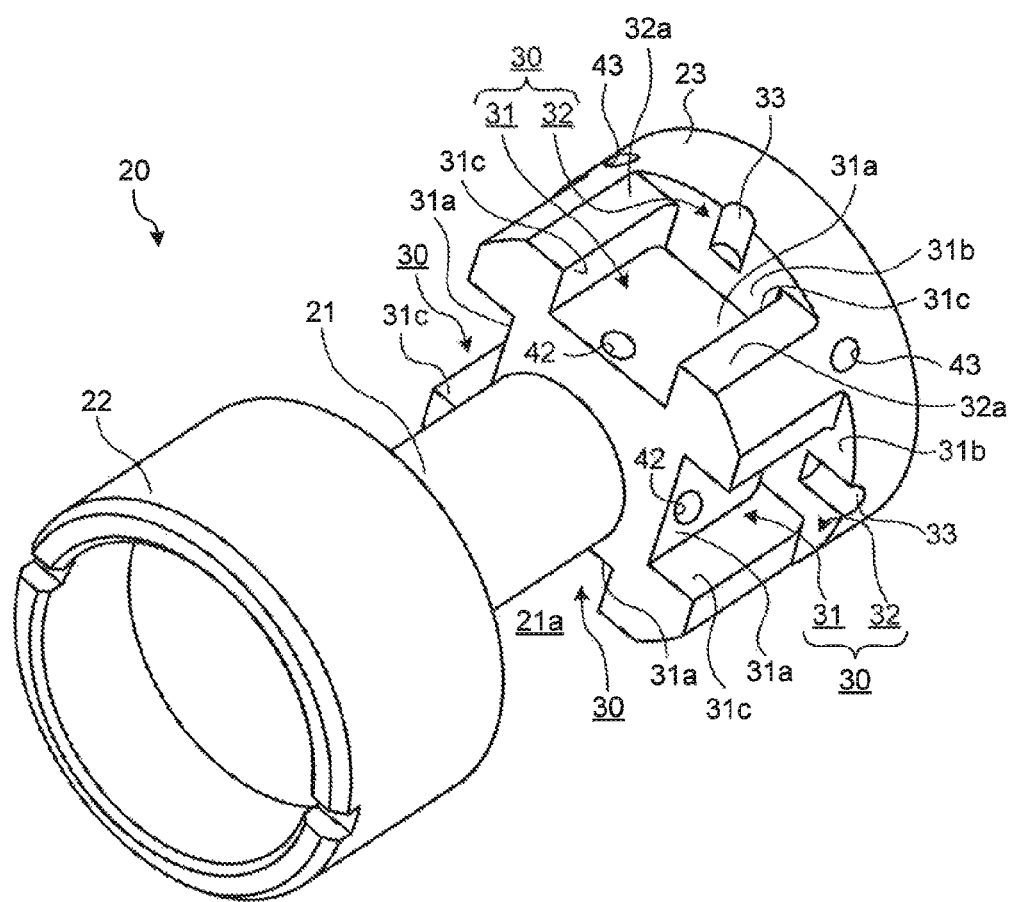
FIG. 4 is a perspective view of a spool applied to the valve device illustrated in FIG. 1-1.
Figure 5:
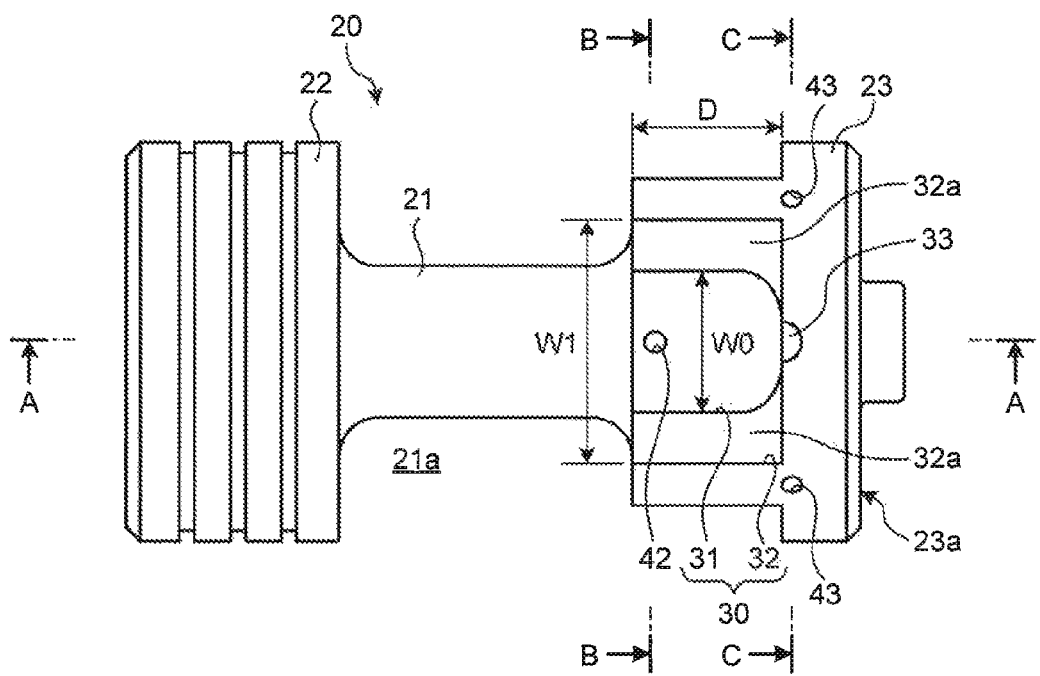
FIG. 5 is a plan view of the spool illustrated in FIG. 4.
Figure 6:
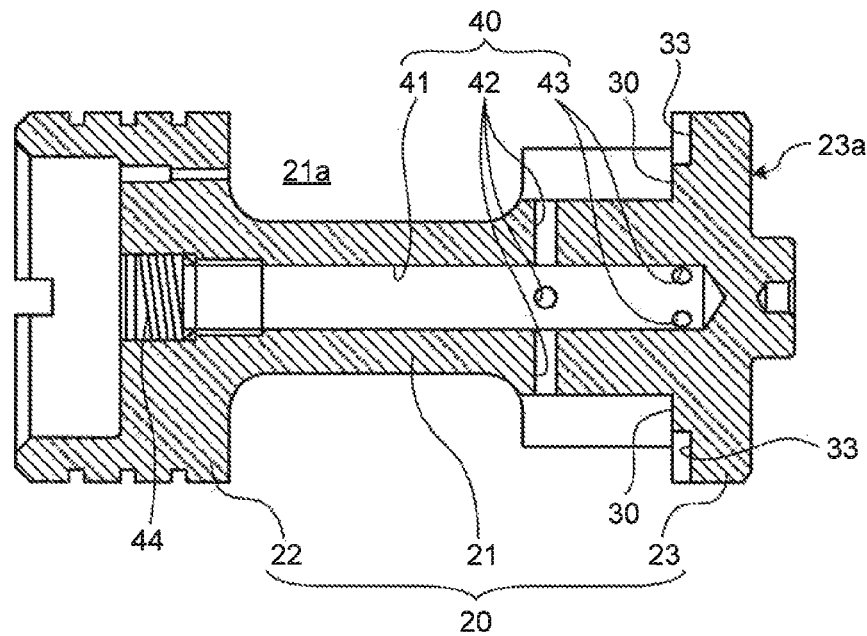
FIG. 6 is a sectional view taken along line A-A of FIG. 5.

The spool 20 is a cylindrical member formed to have an outer diameter with which the spool 20 can be slidably inserted into the spool bore 11 of the valve body 10. As illustrated in FIGS. 4 to 6, a small-diameter portion 21 is provided at the intermediate portion of the spool 20 in the axial direction. The small-diameter portion 21 is configured to reduce the outer diameter thereof compared with large-diameter portions 22 and 23 located on both sides, and to form an annular space (outer peripheral space 21a) around an outer periphery between the two large-diameter portions 22 and 23. As illustrated in FIGS. 1-1 to 2-2, the large-diameter portions 22 and 23 at both ends are inserted into the spool bore 11 of the valve body 10, so that the spool 20 can move along the axial direction thereof with respect to the valve body 10 using the large-diameter portions 22 and 23 as guides. The first embodiment shows by an example the valve device 1 in which an end face 23a of the spool 20 is coupled to a rod r and the spool 20 moves in an axial direction thereof with respect to the valve body 10 by way of the rod r.

Figure 7:
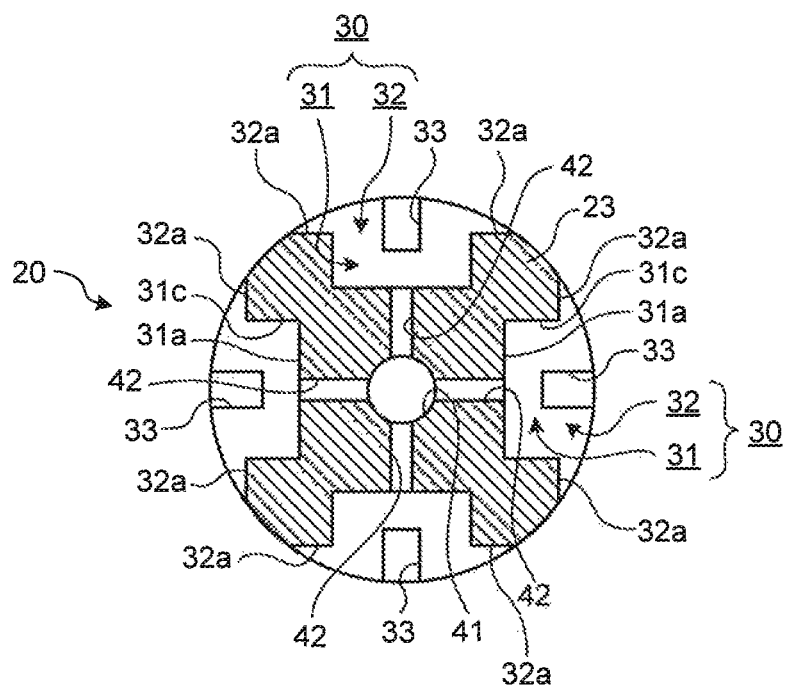
FIG. 7 is a sectional view taken along line B-B of FIG. 5.
Figure 8:
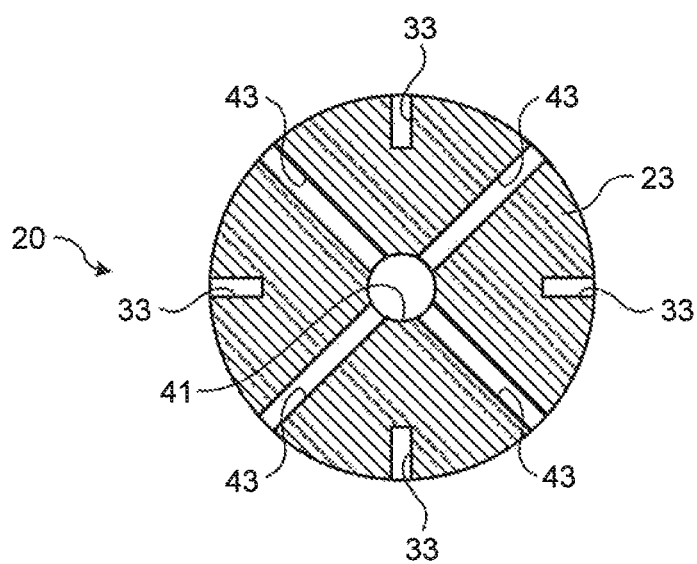
FIG. 8 is a sectional view taken along line C-C of FIG. 5.

As illustrated in FIGS. 1-1 to 2-2, the large-diameter portion 23 located on the right side of the spool 20 has four notches 30 at positions keeping a predetermined distance from the end face 23a of the large-diameter portion 23 such that the notches 30 are open to the outer peripheral space 21a of the small-diameter portion 21 and an outer peripheral surface of the large-diameter portion 23. The notches 30 are formed at equal intervals around a center axis of the spool 20 and each include a main notch portion 31 and a widening notch portion 32, as illustrated in FIGS. 4 and 7.

The main notch portion 31 is a rectangular parallelepiped space formed along the axial direction and a radial direction of the spool 20 and is formed so as to be open to the outer peripheral space 21a of the small-diameter portion 21 via a rectangular opening formed along the radial direction of the spool 20, as illustrated in FIGS. 4 to 7. An inner bottom face 31a of the main notch portion 31 located on the center side of the spool 20 is a flat face parallel to the center axis of the spool 20 and orthogonal to the radial direction of the spool 20. An inner end face 31b of the main notch portion 31 facing the outer peripheral space 21a of the small-diameter portion 21 is formed so as to be orthogonal to the center axis of the spool 20. The main notch portion 31 is formed so as to have the same opening width W0 of an opening in the entire area of the main notch portion 31, that is, the width W0 in the direction orthogonal to the center axis of the spool 20.

The widening notch portion 32 is formed at an opening edge of the main notch portion 31 so as to be open to the outer peripheral surface of the large-diameter portion 23 and the outer peripheral space 21a of the small-diameter portion 21, as illustrated in FIGS. 4 to 7. The opening edge of the main notch portion 31 has a flat surface 32a. The widening notch portion 32 is formed such that the opening width W1 of the opening is larger than the opening width of the main notch portion 31, and a dimension D along the center axis of the spool 20 is the same as that of the main notch portion 31. In other words, the widening notch portion 32 of the notch 30 is formed at the outer peripheral surface of the large-diameter portion 23 such that the opening width W1 of the opening is larger than the dimension of the inner bottom face 31a of the main notch portion 31 at the opening edge of the main notch portion 31. Neighboring widening notch portions 32 keep predetermined intervals therebetween so as to make the outer peripheral surface of the large-diameter portion 23 located between the neighboring widening notch portions.

Incidentally, reference numeral 33 in the figure denotes an adjustment groove formed in the inner end face 31b of the notch 30. The adjustment groove 33 is a semicircular column groove formed in the radial direction of the spool 20.

The spool 20 of the valve device 1 has a detour passage 40 between the inner bottom face 31a of the notch 30 and the outer peripheral surface of the large-diameter portion 23, as illustrated in FIGS. 4 to 8. The detour passage 40 includes only one central hole 41 formed at a portion of the center axis of the spool 20, four inlet holes 42 formed from the respective inner bottom faces 31a of the notches 30 to the central hole 41, and four outlet holes 43 formed from the outer peripheral surface of the large-diameter portion 23 to the central hole 41. The outlet hole 43 is formed such that the distance from the end face 23a of the large-diameter portion 23 to the outlet hole 43 in the axial direction of the spool 20 is approximately the same as the distance from the end face 23a to the adjustment groove 33. In addition, the outlet hole 43 is formed at a position equidistant from the two adjustment grooves 33 in a circumferential direction of the large-diameter portion 23. Incidentally, reference numeral 44 in the figure denotes a plug for closing the opening end of the central hole 41 formed in the spool 20.

(Operation of Valve Device 1)

An operation of the valve device 1 will be described below with reference to FIGS. 1-1 to 2-2 as appropriate. In the valve device 1, as illustrated in FIGS. 1-1 and 1-2, when the spool 20 moves to the leftmost side of the spool bore 11 in the valve body 10 via the rod r, an outer peripheral surface kept on the side of the end face 23a of the large-diameter portion 23 is located in the spool bore 11. As a result, the notch 30 formed in the large-diameter portion 23 is open to just a pump port 12 and the outlet hole 43 of the detour passage 40 is closed by the spool bore 11. Accordingly, the pump port 12 and the actuator port 13 are blocked by the spool 20, and for example, the hydraulic cylinder C also is shut off (close position).

When the spool 20 gradually moves from the above position toward the right side of the spool bore 11 in the valve body 10 via the rod r, as illustrated in FIGS. 2-1 and 2-2, the adjustment groove 33 and the outlet hole 43 of the detour passage 40 are open to the actuator port 13, and then, the notches 30 of the large-diameter portion 23 are open to the actuator port 13 via the widening notch portions 32.

Accordingly, oil in the pump port 12 flows through the outer peripheral space 21a of the small-diameter portion 21 and the notch 30 of the large-diameter portion 23 to the actuator port 13, and also oil in the notch 30 flows through the detour passage 40 to the actuator port 13. Thus, the oil in the actuator port 13 is supplied to the pressure chamber of the hydraulic cylinder C through the discharge side oil passage Lo. As a result, for example, a piston rod of the hydraulic cylinder C starts to elongate (open position).

Figures 1, 9:
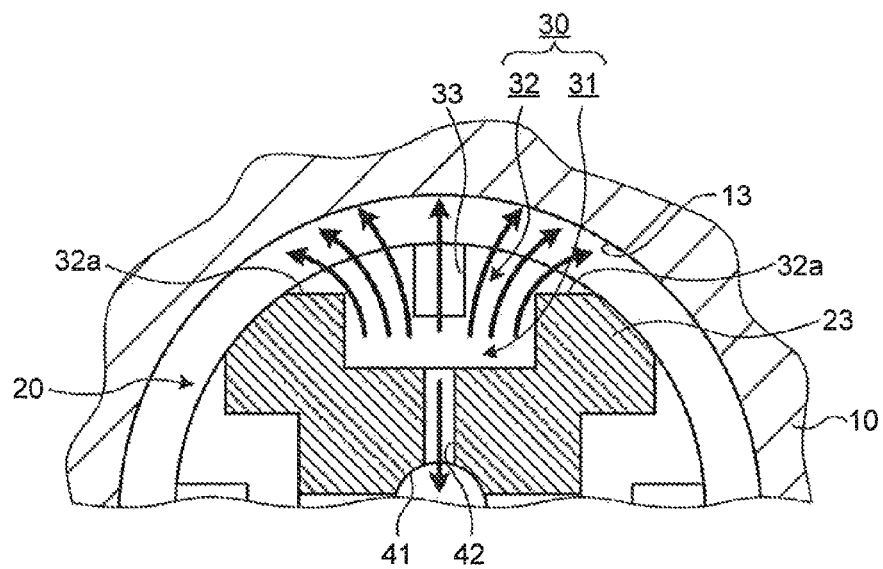
Figures 2, 9:
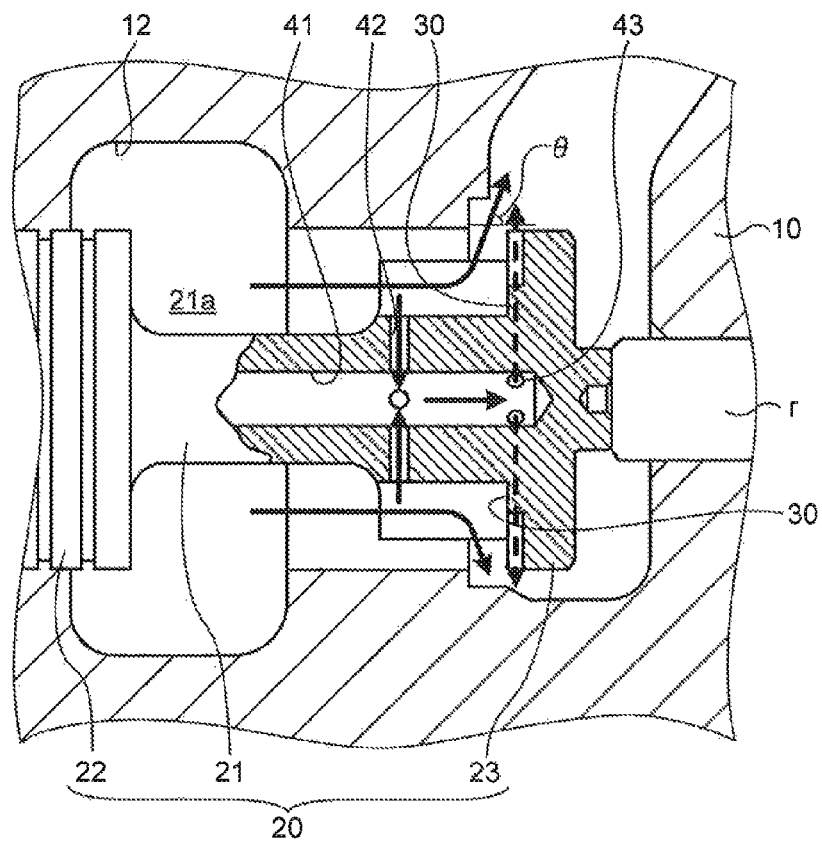

Here, the valve device 1 according to the first embodiment is provided with the widening notch portion 32 at an opening edge of the main notch portion 31. With this configuration, four notches 30 are formed in the large-diameter portion 23 such that the opening width W1 of the opening at the outer peripheral surface is larger than the opening width W0 of the opening at the main notch portion 31. As a result, as schematically illustrated in FIG. 9-1, the flow velocity of the oil, which has reached the main notch portion 31 via the outer peripheral space 21a of the small-diameter portion 21 from the pump port 12, decreases in the widening notch portion 32 of which opening area is expanded, and the oil starts to flow from the four notches 30 to an outer peripheral area of the large-diameter portion 23 evenly.

In addition, some quantity of oil present at the notches 30 flows to the actuator port 13 through the detour passage 40. Thus, a flow rate of oil passing through the notches 30 can be reduced and an oil blowoff angle relative to the actuator port 13 is substantially perpendicular to the center axis of the spool 20.

From these results, the flow force expressed in the following expression is reduced, and when the oil passes through the pump port 12 to the actuator port 13, returning to the close position by the spool 20 is suppressed. Accordingly, oil of a desired flow rate can pass through the pump port 12 to the actuator port 13.

Flow force: $F = C \times Q \times v \times \cos \theta$ (C: constant, Q: flow rate, v: flow velocity, θ: blowoff angle)

To obtain the advantage described above, the widening notch portion 32 just needs to be formed such that the opening width W1 of the opening is larger than the dimension of the inner bottom face 31a of the main notch portion 31 at a processing step. As a result, extra components are not needed, and also there is no possibility of causing problems such as an increase in manufacturing cost and a complicated manufacturing operation.

The first embodiment shows by an example that a plurality of valve devices 1 is included in a valve unit Y in parallel, but a valve device according to the present invention may not necessarily be arranged in plural.

Figures 1, 10:
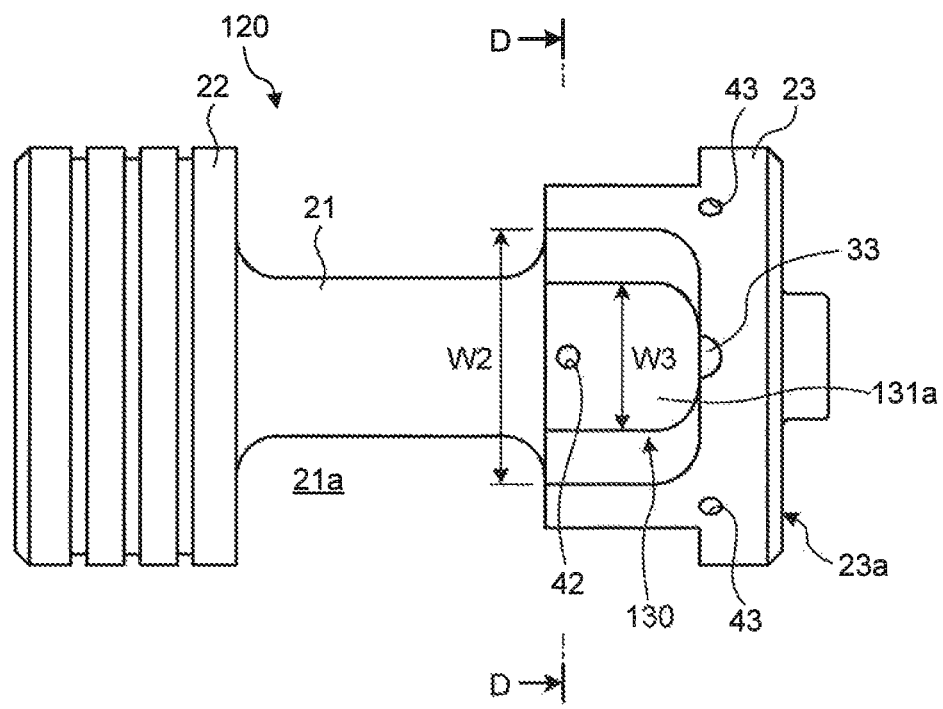
Figures 2, 10:
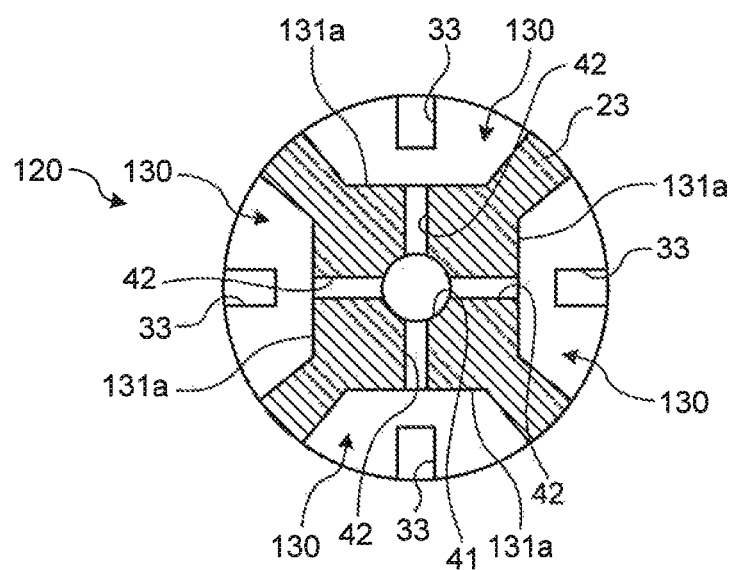

Also in the first embodiment, the notch 30 is formed such that the opening width W1 of the opening is larger than the dimension of the inner bottom face 31a of the main notch portion 31 by providing the widening notch portion 32 at the opening edge of the main notch portion 31, but the present invention is not necessarily limited thereto. For example, as in a second embodiment illustrated in FIGS. 10-1 and 10-2, a notch 130 of a spool 120 may be formed in a trapezoidal shape. In this case, an inner bottom face 131a located on the center side spreads toward the outer periphery such that the opening width W2 of the opening gradually extends from the width W3 of the inner bottom face 131a. As a result, similar operation and effect also can be obtained. Incidentally, in the second embodiment, similar configurations to those in the first embodiment are denoted by the same reference numerals and a detailed description of each will not be repeated.

REFERENCE SIGNS LIST

1 VALVE DEVICE
10 VALVE BODY
11 SPOOL BORE
12 PUMP PORT
13 ACTUATOR PORT
20 SPOOL
21 SMALL-DIAMETER PORTION
21a OUTER PERIPHERAL SPACE
22,23 LARGE-DIAMETER PORTION
30 NOTCH
31 MAIN NOTCH PORTION
31a INNER BOTTOM FACE
32 WIDENING NOTCH PORTION
40 DETOUR PASSAGE
41 CENTRAL HOLE
42 INLET HOLE
43 OUTLET HOLE

The invention claimed is:

1. A valve device including a spool having a small-diameter portion and a large-diameter portion in parallel to an axial direction, the spool being arranged in a spool bore formed in a valve body, the valve device being configured to switch between an open position and a close position by moving the spool in the axial direction with respect to the valve body, the open position allowing passage of oil through a gap between two ports in the spool bore via a notch formed in the large-diameter portion from an outer peripheral space of the small-diameter portion, the close position blocking passage of oil through the gap between the two ports by the large-diameter portion, wherein the notch of the large-diameter portion includes:
a main notch portion being open to the outer peripheral space of the small-diameter portion via a rectangular opening formed along a radial direction of the spool, and having the inner bottom face at a portion located on a center side of the spool, the inner bottom surface being parallel to the center axis of the spool and orthogonal to the radial direction of the spool; and
a widening notch portion having a larger dimension than the main notch portion and being open to the outer peripheral surface of the large-diameter portion, wherein the main notch portion includes an adjustment groove on an inner end face of the main notch portion facing the outer peripheral space of the small-diameter portion, the adjustment groove extending along the radial direction of the spool and being open to the outer peripheral surface of the large-diameter portion, and wherein the valve device further comprises a detour passage passing through a central hole inside the spool from an inlet hole formed on the inner bottom face of the notch and being open to the outer peripheral surface of the large-diameter portion as an outlet hole, and configured to discharge oil present at the notch from the outer peripheral surface of the large-diameter portion when the spool is arranged at the open position.

* * * * *